United States Patent [19]
Chana

[11] 3,777,863
[45] Dec. 11, 1973

[54] HYDRODYNAMIC UNIT WITH FRICTION CLUTCH

[75] Inventor: Howard E. Chana, Flint, Mich.

[73] Assignee: General Motors Corporation, Detroit, Mich.

[22] Filed: Nov. 19, 1971

[21] Appl. No.: 200,399

[52] U.S. Cl. .............................. 192/3.33, 192/85 A
[51] Int. Cl. ............................................ F16d 39/00
[58] Field of Search.................... 192/3.29, 3.3, 3.33; 74/688

[56] References Cited
UNITED STATES PATENTS

| | | | |
|---|---|---|---|
| 2,839,951 | 6/1958 | Winther | 74/688 X |
| 3,485,328 | 12/1969 | Bilton | 192/3.3 |
| 3,239,037 | 3/1966 | Crosswhite | 192/3.33 X |
| 2,950,630 | 8/1960 | Zeidler | 192/3.33 X |
| 2,860,747 | 11/1958 | Kelley | 192/3.3 |
| 3,415,345 | 12/1968 | Cadiou | 192/3.33 |

Primary Examiner—Benjamin W. Wyche
Attorney—W. E. Finken et al.

[57] ABSTRACT

Hydrodynamic torque-transmitting unit having a engageable friction clutch for establishing a selective mechanical drive in parallel with the hydraulic drive through the unit which is located directly between and the front cover of the housing a disk-like shroud fixed to the housing so that fluid forces generated by rotating unit rotor members do not adversely affect clutch operation.

4 Claims, 1 Drawing Figure

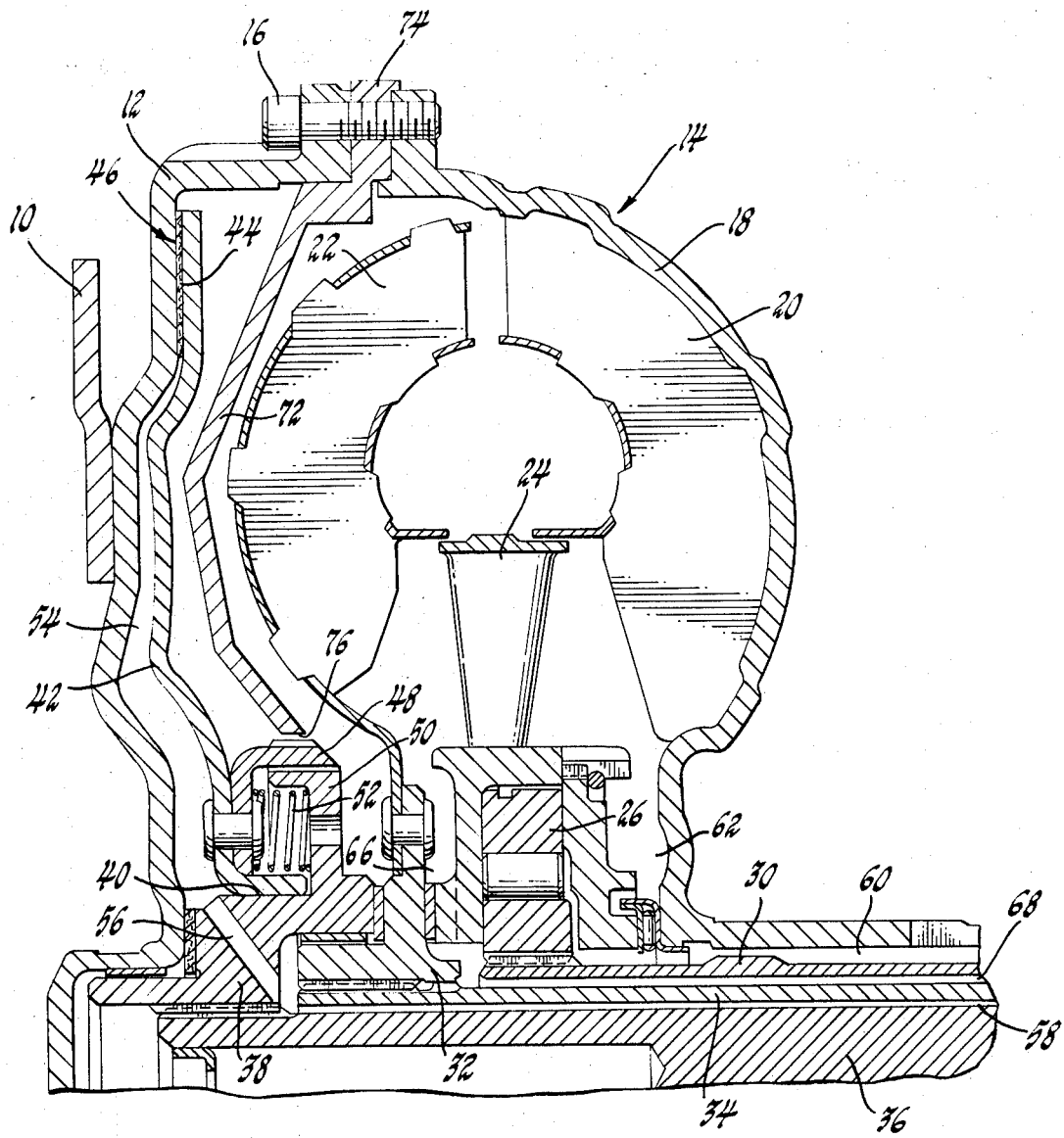

HYDRODYNAMIC UNIT WITH FRICTION CLUTCH

This invention relates to hydrodynamic torque converters and couplings and more particularly to a hydrodynamic unit having a selectively-engageable friction clutch for establishing a mechanical drive in parallel with the hydraulic drive through the unit shielded by rotatable shroud construction fixed to the unit housing to improve clutch operation.

Prior to the present invention, some hydrodynamic torque converters and couplings have been provided with a selectively engageable friction clutch which is employed to provide a mechanical power path separate from the hydraulic drive through the unit for split-torque or for all mechanical drives. Such clutch construction is particularly beneficial in change speed torque converter transmissions for vehicles to increase transmission operating efficiency. While such clutches have been used in transmission applications, split torque usage has been limited to small diameter clutches where oil pressure effects are small or as lock-up clutches where differential speeds are low. For example, if there is a shift from an open converter to a split-torque drive for a cruising operation in a torque converter transmission, the centrifugal pressures on opposite sides of the clutch plate if mounted in the hydrodynamic unit are often unequal thus making clutch apply and release difficult to calibrate.

prior to the present invention, high capacity large diameter clutches located in the hydrodynamic torque transmitting unit for any purpose other than simple lock-up have been difficult to control. This difficulty often results from the variable and adverse effects of the fluid forces within the unit acting on the clutch piston or pressure plate.

This invention is directed to a fluid torque converter or coupling in which special provision is made to sharply reduce the adverse effect of fluid forces including centrifugals occurring within the unit that detracts from the control of the friction clutch operatively disposed therein.

In the preferred embodiment of this invention there is a hydrodynamic torque converter having a housing with front and rear covers and with an annular disk-like shroud peripherally secured in the housing between the covers. This shroud extends radially within the housing and cooperates with the front cover to form a fluid chamber within the housing which receives a hydraulically operated clutch that is selectively engageable with the front cover to establish a mechanical power path in parallel with the hydraulic power path through the converter. The pressure plate of this clutch cooperates with the front cover of the housing to provide a clutch control chamber operatively connected by passage means to any suitable transmission control. The clutch is released by feeding transmission oil into the converter through the clutch control chamber and is applied by static converter pressure in response to the controlled exhaust of the fluid from the clutch control chamber. The clutch plate being located between two members which rotate at pump speed is not adversely influenced by fluid pressures generated by the turbine. Thus the engagement force acting on the clutch plate is not a function of the relative speed of the pump and turbine so that control of the clutch is materially simplified for all pump, turbine and clutch plate speeds.

It is an object of this invention to provide a hydrodynamic torque converter or coupling unit having a fluid-operated friction clutch therein selectively engageable to provide a mechanical drive through the unit and having new and improved construction for substantially eliminating the adverse effect of fluid forces occurring within the unit on the control of the friction clutch.

Another object of this invention is to provide a new and improved torque transmitting fluid unit having a hydraulically operated friction clutch disposed therein for providing a mechanical drive in parallel with the hydraulic drive through the unit. This unit incorporates a shroud construction disposed between the output rotor means of the fluid unit and the clutch to isolate the clutch from fluid forces that are a function of relative speeds of the pump and turbine means so that the clutch engagement force is primarily the static pressure of the unit.

Another object of this invention is to provide a new and improved hydrodynamic torque transmitting unit having input and output rotor means disposed within a rotating housing and further having a selectively engageable friction clutch within the unit and including a shroud which isolates the clutch plate from the rotor means so that fluid forces built up by the rotor means do not adversely affect the operation of the clutch.

These and other objects, features and advantages of this invention will become more apparent from the detailed description and drawing of a preferred embodiment of the invention.

The Figure is a cross-sectional view of an upper portion of a hydrodynamic torque converter.

Turning now to the Figure in detail, there is shown an input lug 10 which is drivingly connected to the rotatable annular front cover 12 of a hydrodynamic torque converter 14. Bolts 16 or other suitable securing means are employed to connect the front cover with the annular rear cover 18 of the converter. The converter has a plurality of rotors to form a torus comprising a bladed pump 20 operatively connected to the rear cover, a bladed turbine 22 and a bladed stator 24. The stator 24 is connected through a one-way brake 26 to a ground sleeve 30. The turbine 22 is drivingly connected to the flange of a hub 32 which is splined to a torque-transmitting sleeve shaft 34.

The sleeve shaft 34 extends rearwardly in the transmission and preferably is selectively connected to a sun gear of a planetary gear unit by clutch means as disclosed in my U.S. application Ser. No. 177,771, filed Sept. 3, 1971 for Automatic Transmission and Controls. The sleeve shaft 34 surrounds a rotable torque transmitting shaft 36 which extends rearwardly and is drivingly connected to a ring gear as disclosed in my above-identified application. The forward end of this torque-transmitting shaft 36 is splined to a front annular hub 38 disposed within the converter. Hub 38 has an annular shoulder 40 that slidably supports a disk-like plate 42 having an outer annular friction member 44 fixed thereto that is engageable and disengageable with a friction surface on the inside of the front cover 12 of the converter housing to provide a selectively-engageable front clutch 46. The plate 42, the pressure plate of the clutch, carries a series of rearwardly projecting fingers 48 that extend into openings formed in a radial flange 50 of the hub 38 to drivingly connect the friction plate 42, the hub 38 and the drive shaft 36. Tickle spring means such as spring 52 are trapped between the flange 50 and the friction plate 42 to urge the friction plate forwardly so that the clutch 46 has a positive engagement bias at all times. The friction plate 42 and the front cover 12 of the converter housing form a chamber 54 which is connected by passages 56 in hub 38 to a converter clutch line 58. The feeding of transmission fluid to the converter from controls such as disclosed in my above-identified prior application through line 58, passage 56 and chamber 54 results in a pressure in chamber 54 causing disengage of clutch 46. The chamber 54 can be relieved of pressure for apply of the clutch by the static pressure in the converter by opening converter clutch line 58 to an exhaust in the controls. When the engagement of clutch 46 is desired for split torque or all mechanical drive, the converter 14 may be supplied with working fluid through a feed passage 60 which communicates with one converter inlet passage 62. In both cases converter discharge is through converter outlet passage 66 into discharge passage 68.

In any rotating drum of oil such as the torque converter described above the pressure at any point from the rotating axis is equal to the static pressure at the center of rotation plus the centrifugal pressure which is a function of the distance from the axis of rotation and the square of the speed of rotation of the fluid. To substantially eliminate the centrifugal pressure effects of the working fluid on the pressure plate 42 of clutch 46 there is provided an annular inner shroud 72 which has an outer flange 74 connected between the front and rear housings 12 and 18 by bolts 16. This shroud is a disk-like part that is disposed between the bladed turbine 22 and the clutch pressure plate 42 and terminates in an annular opening 76 of a diameter sufficient to clear the flange 50 of hub 38. The shroud forms an isolated fluid chamber within the converter housing formed by the front and rear covers 12 and 18.

The pressure plate 42 is thus located in the fluid chamber and between the front cover 12 and the shroud 72 both of which rotate at pump speed. The centrifugal pressure on both sides of the clutch or pressure plate 42 is equal for all pump speeds so that the clutch plate in effect floats between the front cover and the shroud with the lightly loaded ticking springs 52 keeping the clutch plate to the left ready for a shift when the chamber 54 is opened to exhaust through the controls. With this construction the clutch plate 42 has an engagement force to the left which is primarily dependent on the static pressure of the converter which is not a function of relative speeds of the pump, turbine or clutch plate. This pressure being a fixed pressure provides for excellent control of the clutch regardless of pump, turbine or clutch plate speed.

Although a preferred embodiment of the invention has been shown and described for purposes of illustrating the invention, other embodiments will be apparent to those skilled in the art. Thus this invention is not to be limited to the particular embodiment shown and described but only by the following claims.

I claim:

1. A hydrodynamic torque transmitting unit comprising a rotatable housing adapted to be filled with a presurized working fluid and having input rotor means operatively disposed therein, connector means operatively connecting said input rotor means to said housing, output rotor means operatively disposed in said housing and cooperating with said input rotor means to form a torus for circulating working fluid therebetween and to provide a hydraulic power path through said unit, clutch means operatively disposed within said housing between said output rotor means and the interior of said housing, said clutch means having a pressure plate operatively disposed adjacent to said housing to form a hydraulic clutch control chamber therewith, said clutch means further having friction means selectively engageable with the interior of said housing to establish a mechanical power path in parallel with said hydraulic power path, fluid passage means for supplying fluid to said clutch control chamber to feed working fluid to said unit and effect the disengagement of said clutch means and to exhaust fluid from said control chamber to permit said clutch means to be engaged, and shroud means separate from said clutch means secured to said housing and extending radially inwardly therefrom between said output rotor means and said pressure plate to separate said pressure plate from said rotor means and thereby form a fluid chamber within said housing filled with working fluid when said unit is transmitting torque so that said clutch means can be engaged primarily by the static pressure of said working fluid.

2. A hydrodynamic torque transmitting unit comprising rotatable input and output means, a rotatable housing having front and rear covers operatively connected to each other to form a chamber for containing a presurized working fluid for said unit, means drivingly connecting said input means to said housing, first rotor means operatively disposed within said housing and connected to said housing for rotation therewith, second rotor means operatively mounted in said housing and cooperating with said first rotor means to form a torus to provide for the fluid transmission of torque through said unit applied to said first or second rotor means, torque transmitting means operatively connected to said second rotor means, selectively engageable clutch means for selectively connecting said input means to said output means, said clutch means having a clutch plate, support means supporting said clutch plate for movement in said housing into and out of frictional engagement with one of said covers, said clutch plate cooperating directly with one of said covers to form a clutch control chamber for said clutch means, passage means for supplying working fluid to said control chamber to disengage said clutch means while supplying said unit with working fluid and for exhausting fluid from said control chamber so that static pressure in said unit causes said clutch means to engage, and shroud means covering said second rotor means operatively connected to said housing and interposed directly between said clutch plate and said second rotor means to substantially reduce the effect of variable fluid pressures including centrifugal pressure generated by said rotor means on said clutch plate thereby optimizing the selective engagement and disengagement of said clutch means.

3. In a hydrodynamic torque transmitting unit comprising rotatable input and output means, a rotatable housing operatively connected to said input means having front and rear cover plates to form a closed container for containing a working fluid therein, input rotor means operatively connected to said rear cover plate to provide a pump means for pumping fluid within said housing, output rotor means facing said input rotor means to provide turbine means for receiving fluid exiting from said pump means and for transmitting torque developed thereon to said output means and to direct the fluid back toward said pump means, selectively engageable clutch means disposed within said housing to provide a mechanical power path therethrough, said clutch means having a disk-like clutch plate disposed ajdacent to said front cover plate operatively connected to said output means and selectively movable into engagement with said front cover plate to thereby operatively connect said input means with said output means, said clutch plate cooperating with said cover plate to form a fluid chamber therein, passage means for supplying operating fluid into said chamber that provides a disengagement bias to said clutch plate for the release of said clutch means and to supply said unit with working fluid, and annular shroud means operatively connected to said housing and extending radially therein to substantially cover said output rotor means and separate said output rotor means and said clutch plate so that said clutch plate is disposed between said front cover and said shroud and so that the fluid forces generated by said output rotor means do not adversely affect the operation of said clutch means.

4. A hydrodynamic torque transmitting unit comprising rotatable input and output means, rotatable front and rear covers operatively connected to each other forming a housing to receive and contain a working fluid therein, means drivingly connecting said input means to said housing, bladed pump means operatively disposed within said housing and operatively connected to said housing for circulating fluid within said unit, turbine means rotatably mounted in said housing adjacent to said front cover and cooperating with said bladed pump means to form a torus for receiving the fluid circulated by said pump means for transmitting torque to said output means, means drivingly connecting said turbine means to said output means, selectively engageable clutch means having an annular clutch plate cooperating with said front cover of said housing to form a control chamber for said clutch means, fluid passage means for supplying an operating fluid into said control chamber for exerting a force on said clutch plate to release said clutch and for exhausting fluid from said control chamber so that static converter pressure exerts a force on said clutch plate to cause the engagement of said clutch means, and annular shroud means operatively connected to said housing and operatively disposed between said clutch plate and said rotor means to cover and isolate said clutch plate from the force of fluid generated by said turbine means when rotating to permit said clutch means to be operated within a space bounded by said front cover and said shroud means in which the centrifugal pressure on both sides of said clutch plate determined by the rotational speed of said input is substantially equalized to optimize modulation of engagement and disengagement of said clutch means by the exhaust and supply by fluid to said control chamber.

* * * * *

PO-1050
(5/69)

UNITED STATES PATENT OFFICE
CERTIFICATE OF CORRECTION

Patent No. 3,777,863          Dated December 11, 1973

Inventor(s) Howard E. Chana

It is certified that error appears in the above-identified patent and that said Letters Patent are hereby corrected as shown below:

In the Abstract, line 1, after "a" insert -- selectively --;

line 2, after "a" delete "selective";

lines 4 and 5, delete "and the front cover of the housing";

line 6, after "housing" insert -- and the front cover of the housing --.

Column 3, line 17, delete "one" and substitute therefor -- the --.

Signed and sealed this 5th day of November 1974.

(SEAL)
Attest:

McCOY M. GIBSON JR.          C. MARSHALL DANN
Attesting Officer             Commissioner of Patents